United States Patent [19]
Browne et al.

[11] Patent Number: 6,019,419
[45] Date of Patent: Feb. 1, 2000

[54] VEHICLE RAIL CRUSH CONTROL SYSTEM AND METHOD

[75] Inventors: Alan Lampe Browne, Grosse Pointe; Gary Lee Jones, Farmington Hills, both of Mich.

[73] Assignee: General Motors Corporation, Detroit, Mich.

[21] Appl. No.: 08/994,508

[22] Filed: Dec. 19, 1997

[51] Int. Cl.⁷ .................................................. B60R 21/00
[52] U.S. Cl. ......................... 296/189; 188/375; 188/377; 180/274; 280/784; 293/133
[58] Field of Search ................... 296/188, 189; 293/133; 188/371, 374, 375, 377; 180/274; 280/784

[56] References Cited

U.S. PATENT DOCUMENTS

| 3,831,997 | 8/1974 | Myers . | |
|---|---|---|---|
| 3,842,930 | 10/1974 | Fiala | 180/274 |
| 3,893,726 | 7/1975 | Strohschein | 293/133 |
| 4,346,795 | 8/1982 | Herbert | 188/375 |
| 5,314,229 | 5/1994 | Matuzawa et al. | 296/189 |
| 5,351,791 | 10/1994 | Rosenzweig | 188/372 |
| 5,364,158 | 11/1994 | Watanabe et al. | 296/189 |
| 5,381,871 | 1/1995 | Ohta | 296/188 |
| 5,403,049 | 4/1995 | Ebbinghaus | 293/133 |
| 5,427,214 | 6/1995 | Prottengeier et al. | 188/374 |
| 5,431,445 | 7/1995 | Wheatley | 296/189 |
| 5,441,301 | 8/1995 | Breed et al. | 280/735 |
| 5,460,421 | 10/1995 | Culbertson | 293/133 |
| 5,498,045 | 3/1996 | Morgan et al. | 293/122 |
| 5,544,716 | 8/1996 | White | 280/735 |
| 5,547,216 | 8/1996 | Iwata et al. | 280/734 |
| 5,566,777 | 10/1996 | Trommer et al. | 296/189 |

FOREIGN PATENT DOCUMENTS 1202308  8/1970  United Kingdom ................... 293/133

Primary Examiner—Dennis H. Pedder
Attorney, Agent, or Firm—Charles E. Leahy; Kathryn A. Marra

[57] ABSTRACT

A crush control system for controlling the crush of spaced vehicle side composite structural rails in the event of either a full frontal impact or an offset frontal impact includes a crush controller for each side rail. An actuator is provided to move crush initiators between an inoperative position, which will cause an uncontrolled crush of the rail, and a deployed operative position, which will cause a controlled crush of the rail at half the crush force as an uncontrolled crush. In one embodiment each crush controller is normally inoperative and is controlled by a sensor for each located on the opposite side of the vehicle to become operative when the sensor is impacted. The crush initiators may take the form of a radiused wedge or a knife cutter, and the actuator maintains the crush initiators in deployed position to sustain the controlled crush. In another embodiment sensors on both sides control each crush controller which is normally operative, with a circuit logic to cause a crush controller to become inoperative in an offset frontal impact on the same side of the vehicle, while maintaining a crush controller operative in the event of a full frontal impact.

7 Claims, 6 Drawing Sheets

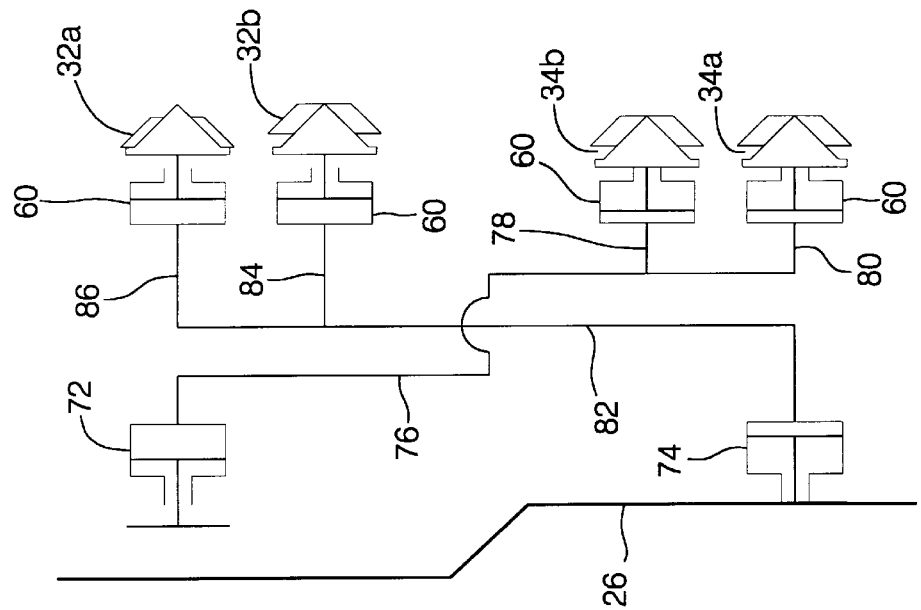
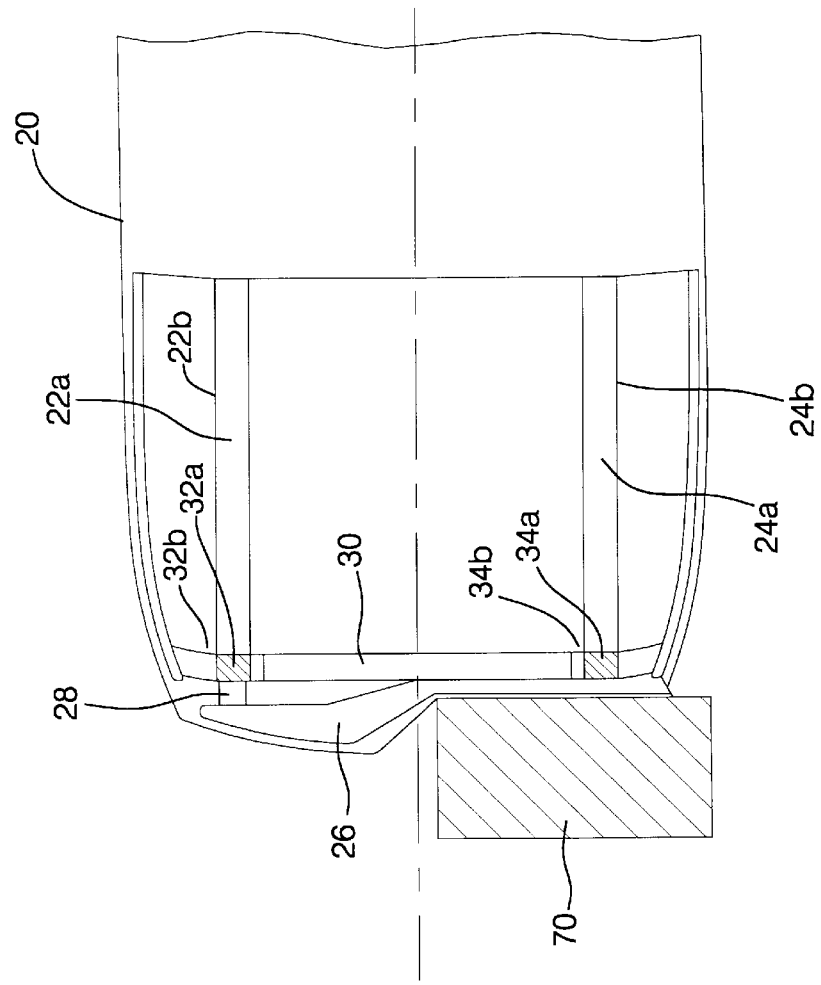
FIG. 7
FIG. 6

VEHICLE RAIL CRUSH CONTROL SYSTEM AND METHOD

This invention relates generally to longitudinal vehicle structural rails subject to crush forces in the event of full frontal and offset frontal vehicle impacts and, more particularly, to a control system and method for varying the crush force of fiber reinforced composite tubular frame rails as a function of the type of impact.

BACKGROUND OF THE INVENTION

Current production automobiles comprise a body formed on a plurality of longitudinal structural steel frame members. Prototype and experimental vehicles with composite frame members have been proposed. In a front engine automobile of this type, a full frontal impact has three principle paths for impact force transmission to and through the vehicle structure. These are outer paths comprising upper and lower longitudinal frame members, and a central path comprising the engine, transmission and, possibly, the engine cradle.

In a full frontal impact at sufficiently high speeds, all three load paths are functional to absorb and dissipate the vehicle's energy as it rapidly decelerates. Testing has shown that the outer load paths together dissipate 40%–70% of the vehicle's energy, while the central path dissipates the remainder. The side longitudinal rails are designed to dissipate energy by deforming at force levels that will provide passenger compartment decelerations consistent with occupant safety requirements.

While a full frontal impact engages the entire front end and all three of an automobile's load paths, in an offset frontal impact, there is only partial overlapping of the fronts of the colliding vehicles. Two techniques have been published which address offset frontal impacts in current production vehicles having steel structural members.

The first technique links the crush responses of the two side load paths through the use of robust cross-car members, such as tie-bars, radiator support brackets, and the engine cradle, in combination with the use of more rigid joints between the longitudinal and cross-car members. The second technique reinforces the passenger compartment to help maintain its integrity.

For both metal structures and proposed composite structures, these techniques have the shortcoming of requiring added structure, which increases vehicle mass and decreases effective crush space. In composite structures, these techniques make crush control problematic, since they make it difficult to initiate and maintain the progressive rail crush needed for proper response.

Thus, there is a need for a crush control technique or method of assuring initiation and maintenance of progressive crush for composite structures at appropriate force levels for both full frontal and offset frontal vehicle impacts.

There is also a need for apparatus that carries out such a method by functioning to initiate and maintain progressive crush for composite structures at appropriate force levels for both full frontal and offset frontal vehicle impacts.

SUMMARY OF THE INVENTION

It is therefore an object of this invention to provide a crush control technique or method of assuring initiation and maintenance of progressive crush for composite structures at appropriate force levels for both full frontal and offset frontal vehicle impacts.

It is another object of this invention to provide apparatus that carries out such a method by functioning to initiate and maintain progressive crush for composite structures at appropriate force levels for both full frontal and offset frontal vehicle impacts.

In an offset frontal impact the total crush force generated by the vehicle rails is halved because the rails on one side of the vehicle are not engaged. To compensate for this loss, it would be ideal to selectively double the crush force for the rails, but only in the event of an offset frontal impact. This selective doubling is needed to ensure that there would be no increase of crush force in the event of a full frontal impact.

Testing on automotive-sized composite structural rails has shown that, depending on the type of composite material used, the use of a crush initiator, in the form of a flanged plug forced into the end of the tube, may halve the crush forces generated by the tube in a dynamic axial crush test. Example test specimens comprised composite 20" hollow tubes having a cross-section 3 ½" square with 0.1" thick walls and ½" outside radiused corner. Materials tested include fiber reinforcements of Kevlar, E-glass, carbon and hybrid combinations.

Testing indicated that, depending on the material type, crush force reductions of approximately 40%–60% occurred, as compared to the same tests conducted without use of the crush initiator. Large reductions were exhibited by plain and twill weaves and by 6K and 12K triax braids, while only those biax braids with carbon fiber reinforcement exhibited large reductions. In contrast, biax braids made with glass and Kevlar fiber reinforcement exhibited little reduction. Thus, if some means could be devised to selectively use crush initiators just in full frontal and not in offset frontal impacts, desired crush force for a vehicle may be achievable in both types of impact. This invention accomplishes that and provides alternatives and advantages directed towards these goals.

In one aspect, this invention features a crush control system for a vehicle subject to full frontal and offset frontal impacts which has longitudinal composite side frame rails each having a peripheral wall, which system controls the crush force of each rail as a function of the type of vehicle impact. The crush control system has a crush controller normally spaced from the front end of each rail that includes a body insertable into the rail, a plurality of crush initiators normally retracted into the body and an actuator operable to deploy the initiators outwardly of the body in a position to initiate controlled crushing at a reduced force level of the frame wall upon vehicle impact. An impact sensor for each actuator is mounted on the side of the vehicle opposite its actuator and is operable when sensing a vehicle impact on its side of the vehicle to operate its actuator.

In another aspect, this invention provides a method of selectively controlling the crush forces generated by a pair of spaced vehicle composite structural side rails in the event of a vehicle full frontal impact or an offset frontal impact, comprising the steps of a. providing a crush manager for each rail having an inoperative position, and an operative position in which it engages the rail to initiate controlled crushing of the frame wall upon vehicle impact, and b. selectively moving the crush managers between positions as a function of the type of vehicle impact.

Preferably, this method includes the steps of c. normally locating each crush manager in the inoperative position, and d. moving each crush manager to the operative position in response to a vehicle impact sensed in front of the opposite side of the vehicle.

In one embodiment the crush initiators comprise a plurality of spaced knife members pivotally mounted on the body in a position normally inwardly of the body and pivotable outwardly of the body by the actuator.

In another embodiment the crush initiators comprise a plurality of circumferentially-spaced wedge members, and mounting means normally mounting the wedge members inwardly of the body for movement radially outwardly of the body by the actuator.

Preferably, the mounting means are engageable by the vehicle structure upon impact to maintain the knife or wedge members outwardly of the body throughout the duration of crushing.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 6 is a view similar to FIG. 4, illustrated during an initial offset frontal impact just prior to rail crush;

FIG. 7 is a view similar to FIG. 5, illustrated at the time represented by FIG. 8 during an initial offset frontal impact just prior to rail crush;

DETAILED DESCRIPTION OF PREFERRED EMBODIMENTS

Figure 1:
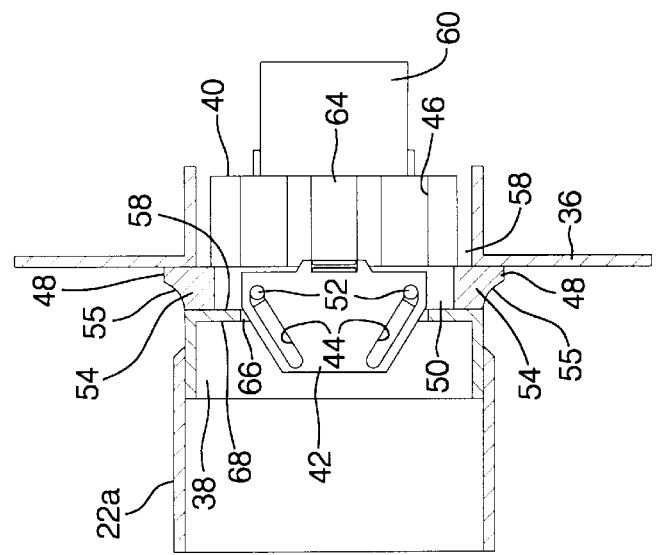
FIG. 1 is a perspective view of one embodiment of a crush control device according to this invention, partially broken away to show the details of construction.

Referring now to FIGS. 1–4 of the drawings, an automotive vehicle 20 includes pairs of upper and lower structural side rails 22a, 22b, 24a, 24b (only the upper rails 22a and 24a are illustrated). These side rails are made of a composite material and have a generally square cross-section. Composite materials in the context of this invention comprises fiber-reinforced composite material structures formed of a single or multiple layers or plies of reinforcing fabric that is made of oriented or randomly arranged fibers of such materials as carbon, Keviar, glass, and hybrids thereof, with the fibers embedded in a solid matrix of a thermosetting or thermoplastic resin material such as epoxy or polyester. These materials can be manufactured by many methods, such as SRIM (structural reaction injection molding) or RTM (resin transfer molding) techniques. These composite structural frame members are usually of hollow tubular form having a square or rectangular cross-section, although other shapes can be used.

Vehicle 20 mounts the usual bumper 26 on supports 28. A cross-body member 30 mounts crush controllers 32a, 32b, 34a & 34b spaced in front of the respective side rails 22a, 22b, 24a & 24b. The crush controllers are identical and, thus, only one, crush controller 32a, will be described in detail. A crush controller body includes an optional mounting flange 36 for attaching components, such as the bumper beam 26, to the front end of the assembly, a rail guide 38, and a rear wedge guide 40. The crush controllers could alternatively be mounted directly to bumper 26 using flanges 36, or can be inserted into the front ends of the rails 22a, 22b, 24a, 24b and attached by an adhesive between the rails and the rail guide 38. Wedge guide 40 mounts a wedge 42, having four circumferentially-spaced angled guide slots 44, for sliding axial movement in a guide slot 46. Four crush initiators 48, each having a clevis 50, that mounts a pin 52 received in a guide slot 44 of wedge 42, and a crush head 54 having a radiused contact surface 55.

Figure 2:
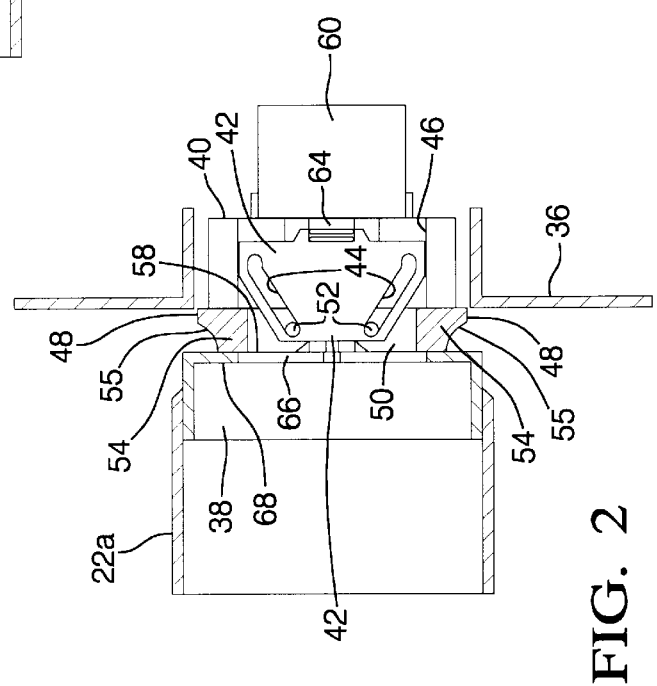
FIG. 2 is a vertical sectional view of the crush control device of FIG. 1, illustrated with the crush initiators retracted in an inoperative condition.
Figure 3:
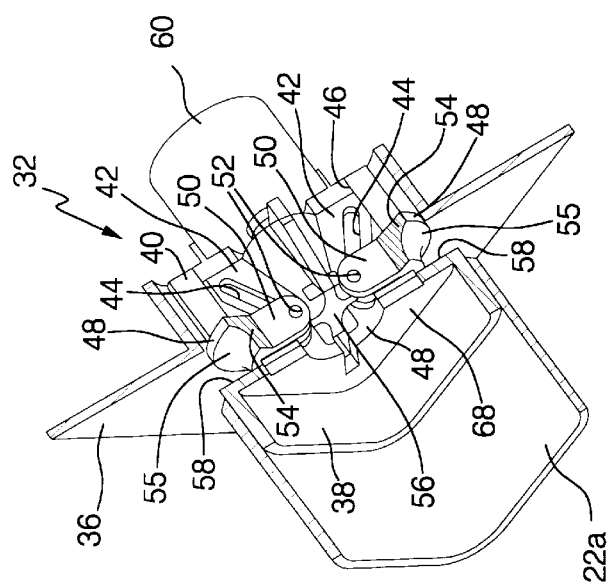
FIG. 3 is a view similar to FIG. 2, but illustrated with the crush initiators deployed in an operative condition.

Rail guide 38 is connected to and spaced from rear wedge guide 40 by a central support 56 which creates a radial crush initiator slide passage 58. A solenoid-operated actuator 60 is secured to the rear of rear wedge guide 40 and to wedges 42 via an arm 64. The inactive position of crush controller 32a is illustrated in FIG. 2. Upon actuation of actuator 60, arm 64 extends to project wedge 42 through openings 66 in the rear face 68 of rail guide 38. This forward movement of guide slots 44 forces pins 52 and their attached crush initiators 48 radially outward in slide passage 58 to the FIG. 3 position, overlying the walls of the front end of rail 22a. Crush initiators 48 will remain in this extended position so long as wedges 42 remain in their projected position.

Selectively controlling operation of the crush controller 32a will selectively determine the amount of crush force that rail 22a can generate when engaged in an impact. If crush initiators 48 are deployed to their operative FIG. 3 position, impact with another vehicle or a barrier 70 will engage contact faces 55 with the ends of the walls of rail 22a. This will cause rail 22a to crush in a controlled manner. In one example, rail 22a will generate 20 kN of crush force with crush initiators 48 deployed as in FIG. 3. However, crush controller 32a will have no effect if the crush initiators 48 are retracted into their inoperative FIG. 2 position. Impact will merely telescope crush controller 32a into rail 22a, which will then crush in an uncontrolled manner, generating double, or 40 kN of crush force. Rail crush forces in this example are thus halved when crush initiators 48 are deployed in operative position.

In the event of an offset frontal impact, only the rails on only one side of the vehicle 20 will participate, along with the central load path, in dissipating the vehicle's pre-impact energy. In a full frontal impact the rails on both sides of the vehicle will be involved in dissipating the same energy. To accommodate both types of frontal impact, the side rails are designed so that the rails on either side of the vehicle generate sufficient crush force, with the crush initiators inoperative, to, with the central load path, dissipate the total pre-impact energy of the vehicle. The crush controllers must be inoperative in an offset frontal impact so that the rails on one side of the vehicle can generate the required high crush force. However, the crush controllers must be operative in a full frontal impact, so that only half the required crush force is generated by the rails on each side of the vehicle. Otherwise, the total rail crush force would be double the required amount and unacceptable passenger compartment deceleration levels might be reached.

Figure 5:
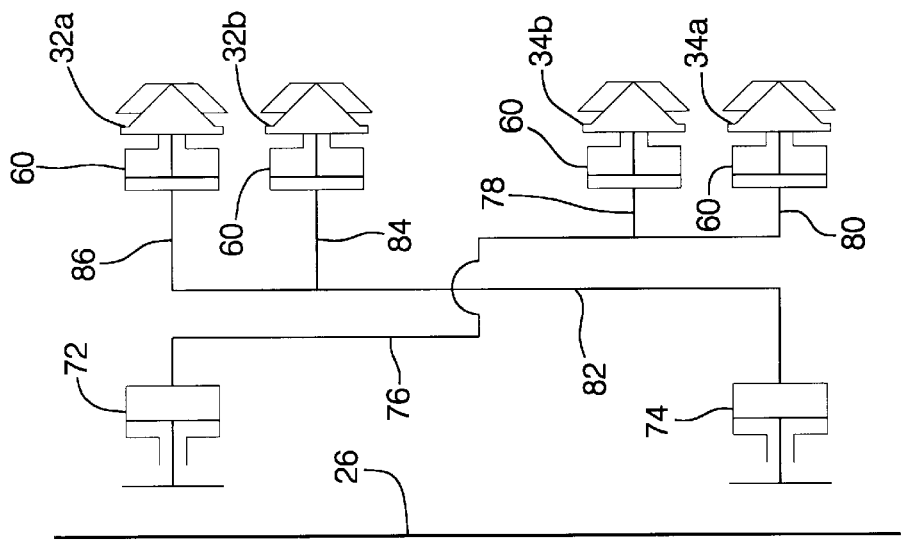
FIG. 5 is an operational schematic view of the crush control system of FIG. 4, illustrating the crush control devices prior to an impact.
Figure 4:
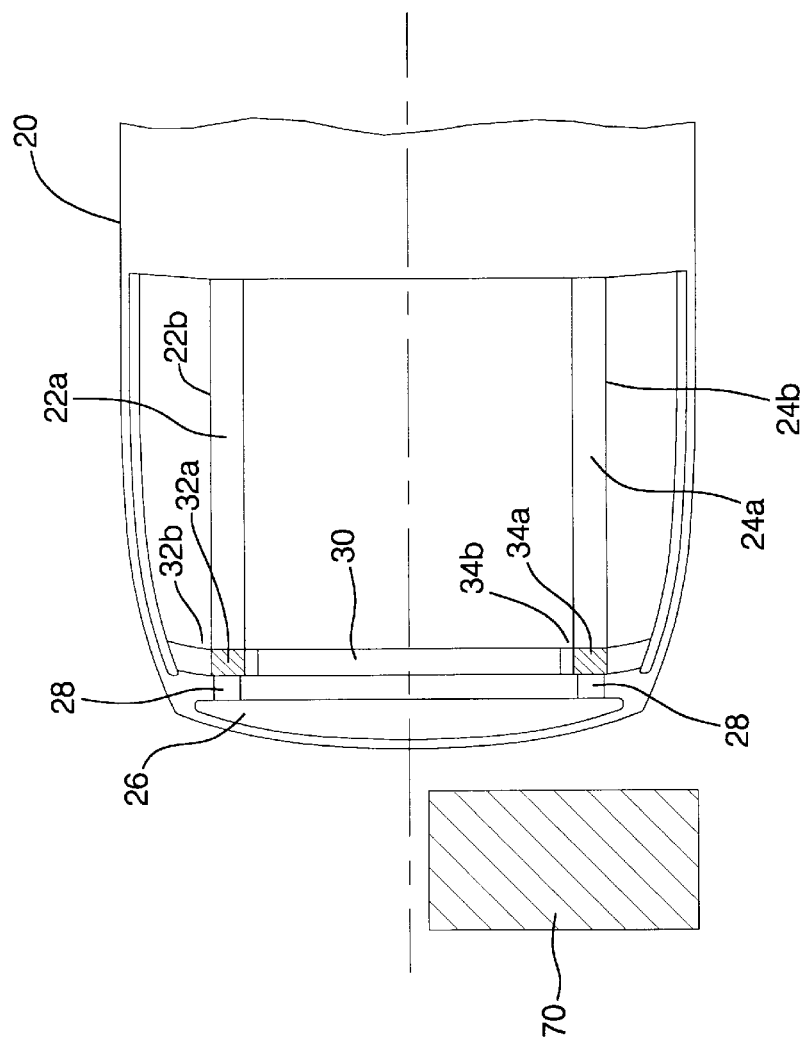
FIG. 4 is a schematic view of the forward portion of a vehicle incorporating a crush control system according to one embodiment of this invention, illustrated just prior to an offset frontal impact.

To control operation of the crash controllers 32a, 32b, 34a, 34b, an impact sensor system is provided. Referring to the preferred embodiment of FIGS. 4 and 5, an impact sensor 72 is provided on the side of the vehicle 20 in front of crush controllers 32a, 32b, and a like sensor 74 is provided on the side of the vehicle in front of crush controllers 34a, 34b. A circuit, comprising lines 76, 78, 80 connects impact sensor 72 to the actuators of crush controllers 34a, 34b. Lines 82, 84, 86 connect impact sensor 74 to the actuators of crush controllers 32a, 32b. Upon sensing an impact, sensor 72 will cause the actuators to deploy the crush initiators 48 of both crush actuators 34a and 34b. Likewise, upon sensed impact, sensor 74 will cause the actuators to deploy the crush initiators 48 of both crush actuators 32a and 32b.

Thus, the sensor that controls a particular crush controller is located on the opposite side of the vehicle from the crush controller and its associated rail. With this impact sensor system, both full frontal and offset frontal impacts are accommodated.

Sensors 72 and 74 are preferably contact switches. These and other reactive type switches, such as proximity switches, or inertial devices, such as ball-in-sleeve accelerometers, could also be used. These reactive devices would function upon initial contact and would be able to readily discriminate between low-energy and severe collisions. Anticipatory devices, such as microwave radar, vision systems, and infrared LED devices could also be used, although operation of the crush controller actuators would have to be reversible in the event that an anticipated impact was avoided or involved no rail crush.

The crush control system operates in the following manner, using as an example an impact where a total of 80 kN of crush force must be generated by the rails. As shown in FIGS. 6 and 7, an offset frontal impact on the left side of vehicle with barrier 70 will be detected by sensor 74, which will cause the actuators of crush controllers 32a and 32b on the other side of vehicle 20 from it to deploy their crush initiators 48. Since sensor 72 senses no impact, crush controllers 34a and 34b will remain inoperative. This will enable rails 34a and 34b to deform in an uncontrolled manner. Each rail will dissipate 40 kN of crush force, together totaling the entire 80 kN. Since rails 32a and 32b are not impacted, the deployment of crush controllers 32a and 32b has no effect.

A symmetrical response would occur for an offset frontal impact on the other (right) side of the vehicle. Crush controllers 32a and 32b would remain inoperative and rails 22a and 22b would generate all of the required 80 kN of rail crush force, while sensor 72 would cause crush controllers 34a and 34b to become operative, to no effect.

Figure 9:
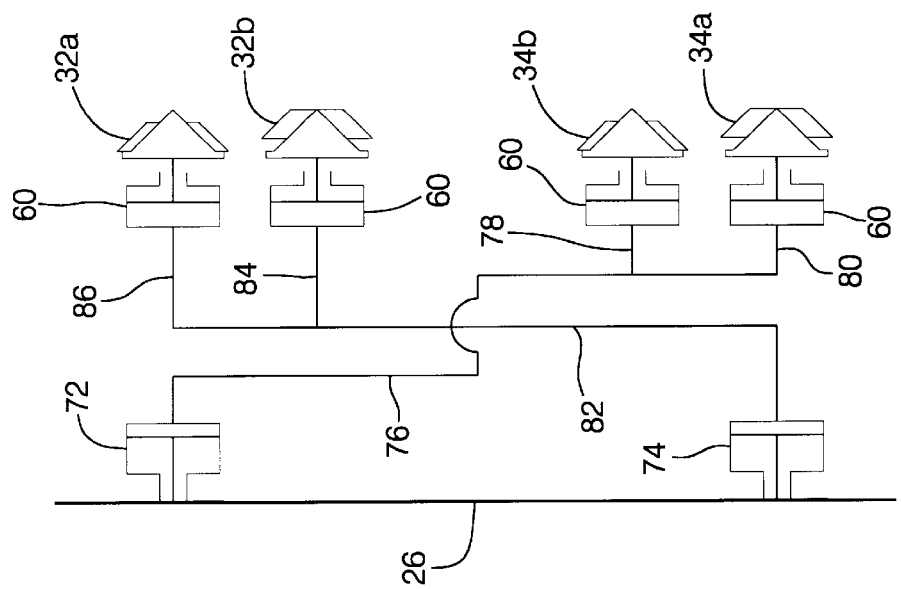
FIG. 9 is a view similar to FIG. 7, illustrated at the time represented by FIG. 8 during full frontal impact just prior to rail crush.
Figure 8:
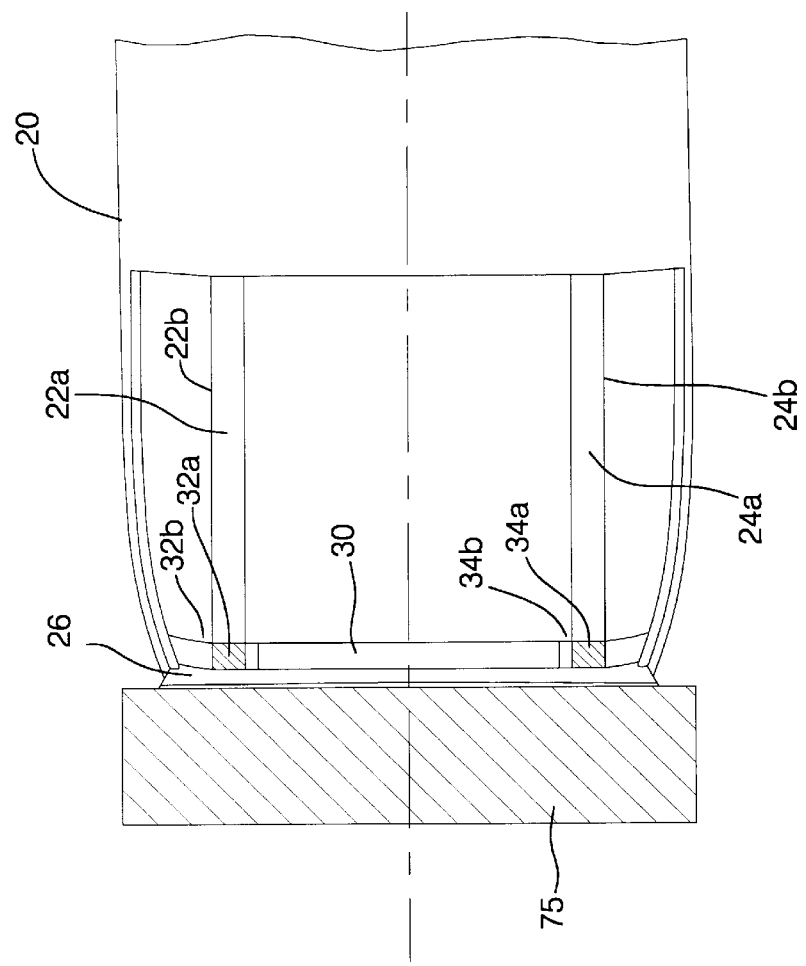
FIG. 8 is a schematic view of the forward portion of a vehicle incorporating a crush control system according to one embodiment of this invention, illustrated during full frontal impact just prior to rail crush.

As shown in FIGS. 8 and 9, a full frontal impact with a barrier 75 will be detected by both impact sensors 72 and 74, which will cause the actuators of all crush controllers 32a, 32b, 34a and 34b to deploy the crush initiators 48. Each rail will now experience controlled crushing, dissipating 20 kN, or only half the crush force as uncontrolled crushing. However, since twice the number of rails is now impacted, the same total rail crush force of 80 kN is dissipated, 20 kN per rail.

Figure 11:
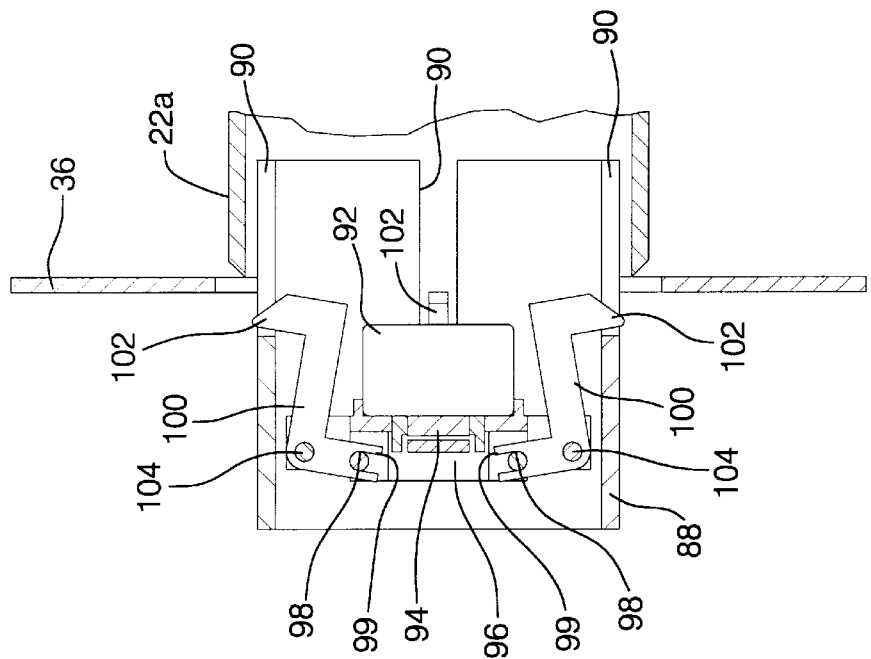
FIG. 11 is a vertical sectional view of the crush control device of FIG. 10, illustrated with the crush initiators retracted in inoperative condition.
Figure 10:
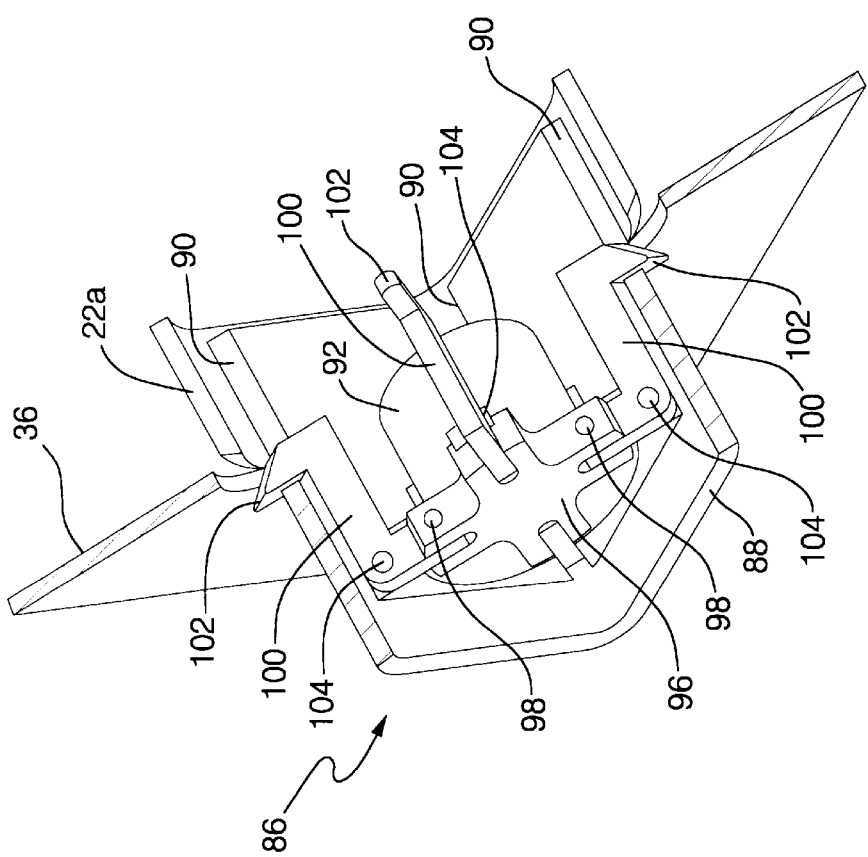
FIG. 10 is a perspective view of another embodiment of a crush control device according to this invention, partially broken away to show the details of construction.
Figure 12:
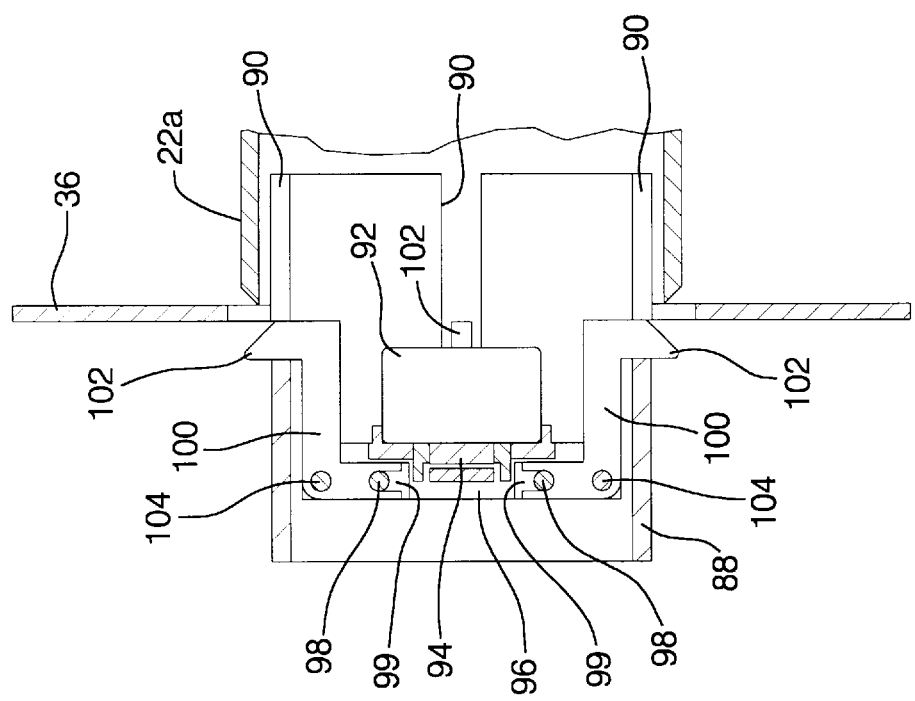
FIG. 12 is a vertical sectional view of the crush control device of FIG. 10, illustrated with the crush initiators deployed in operative condition.

An alternative form of crush controller is illustrated in FIGS. 10–12. A crush controller 86 has a body 88 that is insertable into the side rail 22a. Body 88 has four circumferentially-spaced slots 90 and mounts a solenoid actuator 92 that has a normally extended arm 94. Arm 94 mounts a bracket 96 with four circumferentially-spaced pins 98 that are received in open-end slots 99 of a bellcrank 100. A bracket 102 carries pins 104 that each pivotally mounts one of the bellcranks 100 that have knife cutters 106 on their distal ends at slots 90.

FIG. 11 illustrates crush controller 86 in inoperative position, with actuator arm 94 extended to retract knife blades inwardly of body 88. In this position, an impact would merely telescope crush controller 86 into rail 22a, which will then crush in an uncontrolled manner, as in the FIGS. 1–3 embodiment. Operation of actuator 92 to retract arm 94 pivots bellcranks 100 to deploy knife cutters 106 to their FIGS. 10 and 12 operative position overlying the end of the walls of rail 22a. In the operative position, impact will drive knives into the rail end, beginning a controlled crush. During impact, the bumper or other structure will impact the actuator to keep the arm retracted, assuring that knife cutters remain deployed and sustain the controlled crush.

Figure 13:
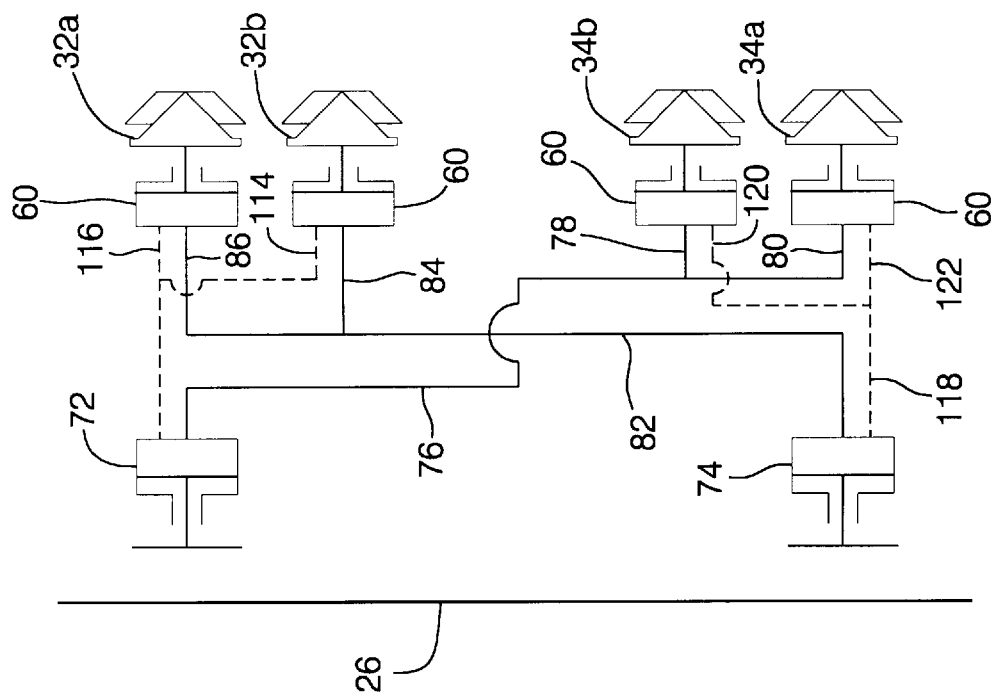
FIG. 13 is an operational schematic view of a further embodiment of crush control system according to this invention, illustrating the crush control devices prior to an impact.

An alternative embodiment of an impact sensor system is shown in FIG. 13. In contrast to the FIG. 5 embodiment, this embodiment has all crush controllers normally in operative position with their crush initiators 48 deployed in operative position. The same primary control circuitry is used as in the FIG. 5 embodiment, with lines 76, 78 and 80 connecting sensor 72 with the actuators of opposite-side crush controllers 34a and 34b, and lines 82, 84 and 86 connecting sensor 74 to the actuators of opposite-side crush initiators 32a and 32b.

This embodiment features a secondary circuit which connects sensor 72 with same-side crush controllers via lines 112, 114 and 116, while lines 118, 120 and 122 connect sensor 74 with same-side crush controllers 34a and 34b. Thus, both sensors are connected to all four crush controllers via the primary and secondary circuits.

In the FIG. 13 embodiment, signals sent through the primary circuit maintain the crush initiators in operative position, while signals sent through the secondary circuit cause the actuators to move the crush initiators to inoperative position. Thus, in an offset frontal impact as in FIG. 6, sensor 74 will signal the actuators of crush controllers 34a and 34b via lines 118, 120 and 122 in the secondary circuit to move to inoperative position, enabling rails 24a and 24b to achieve uncontrolled crush.

Circuit logic has the primary circuit signals override the secondary circuit signals when both signals are received. Thus, in the event of a full frontal impact, the actuators of crush controllers 32a and 32b will receive a primary circuit signal to maintain operational position from sensor 74, and a secondary circuit signal to move to inoperative position from sensor 72. The primary signal circuit overrides the secondary circuit signal and crush controllers will remain in their operative position to initiate a controlled crush of rails 22a and 22b. The same sequence occurs on the other side of vehicle 20, so that all crush controllers remain operative in the event of a full frontal impact.

Both embodiments provide a controlled crush of impacted side rails in a full frontal impact, while enabling the uncontrolled crush of the impacted rails in an offset frontal impact. This enables a vehicle to generate the proper level of crush force and better manage the crush intrusion and passenger compartment deceleration in either impact event.

While only a preferred and alternative embodiments have been illustrated and described, obvious modifications thereof are contemplated within the scope of this invention and the following claims.

What is claimed is:

1. A vehicle subject to full frontal and offset frontal impacts and having a pair of spaced hollow longitudinal composite side frame rails each having a peripheral wall, characterized by a crush control system for controlling the crush force of each rail as a function of the type of vehicle impact, comprising a crush controller normally spaced from the front end of each rail including a body insertable into the rail, a plurality of crush initiators having an inoperative retracted position and an operative deployed position for initiating controlled crushing of the frame wall upon vehicle impact at a reduced force level, and an actuator operable to move the crush initiators between positions, and an impact sensor for each side of the vehicle and associated with only the actuator on the opposite side of the vehicle and operable when sensing a vehicle impact on the side of the vehicle having that impact sensor to operate its associated actuator on the opposite side of the vehicle to move the crush initiator between positions.

2. The crush control system of claim 1, wherein the crush initiators are normally in the operative position, and the impact sensor is operable to operate its actuator to deploy the crush initiator to inoperative position.

3. The crush control system of claim 1, wherein the crush initiators are normally in the inoperative position, and the impact sensor is operable to operate its actuator to deploy the crush initiator to operative position.

4. The crush control system of claim 3, further characterized by the crush initiators comprising a plurality of spaced knife members pivotally mounted on the body in a position normally inwardly of the body in inoperative position and pivotable outwardly of the body to operative position by the actuator.

5. The crush control system of claim 4, further characterized by the mounting means being engageable by vehicle structure upon impact to maintain the knife members in operative position throughout duration of crushing.

6. The crush control system of claim 3, further characterized by the crush initiators comprising a plurality of circumferentially-spaced wedge members, and mounting means normally mounting the wedge members inwardly of the body in inoperative position for movement radially outwardly of the body to operative position by the actuator.

7. The crush control system of claim 6, further characterized by the mounting means being engageable by vehicle structure upon impact to maintain the wedge members in operative position throughout the duration of crushing.

* * * * *